R. WENDLANDT.
ROAD GRIPPING MEANS FOR VEHICLE WHEELS.
APPLICATION FILED DEC. 6, 1915.
1,185,746. Patented June 6, 1916.
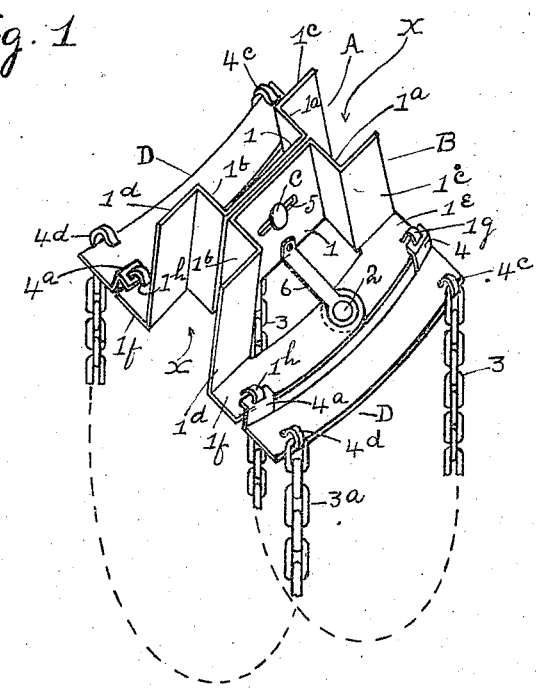
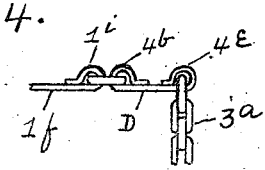
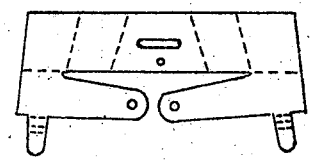
WITNESSES
INVENTOR.
Robert Wendlandt
BY James Watson
ATTORNEY

UNITED STATES PATENT OFFICE.

ROBERT WENDLANDT, OF DULUTH, MINNESOTA.

ROAD-GRIPPING MEANS FOR VEHICLE-WHEELS.

1,185,746.     Specification of Letters Patent.     Patented June 6, 1916.

Application filed December 6, 1915. Serial No. 65,251.

*To all whom it may concern:*

Be it known that I, ROBERT WENDLANDT, a citizen of the United States, residing at Duluth, in the county of St. Louis and State of Minnesota, have invented new and useful Improvements in Road-Gripping Means for Vehicle-Wheels; and I do hereby declare the following to be a full, clear, and exact description of the invention, such as will enable others skilled in the art to which it appertains to make and use the same.

My invention relates to road gripping means for vehicle wheels, and has for its object the provision of means which can be quickly adjusted to the wheel for such purposes and which can be quickly removed therefrom, and which may be made adjustable to various spaces and areas of the wheel which it is desirable to fill or cover.

With this and other objects in view, it consists of the structures, combinations and arrangements of parts hereinafter described and claimed.

In the drawings, Figure 1, is a perspective view of the preferred form of my said invention, partly broken away. Fig. 2 is a plan view of a flat metal blank from which a clamp plate forming part of said preferred form may be formed. Fig. 3 is a tie forming part of the preferred form of said invention. Fig. 4 is a fragmentary detail and elevation of said invention showing one modified method of securing the hereinafter described extension plate to said clamp plate.

In the drawings, A and B, are opposite clamp plates of similar construction, which in operative position are detachably secured together by any suitable means, as by a bolt C. Each of said clamp plates comprises a vertical longitudinal web portion 1; laterally extending vertical wing portions $1^a$ and $1^b$ at opposite ends of said web portion; longitudinally extending vertical terminal flanges $1^c$ and $1^d$ at the outer ends of said wing portions, and a horizontal flange formed on or attached to said terminal flanges and preferably formed in two sections, as $1^e$ and $1^f$, extending toward each other and adapted to overlap each other opposite said central web, in which event the meeting or overlapping ends are secured together by any suitable means or method, as by a rivet 2. Upon the outer longitudinal edge of said horizontal flange, at or near the ends thereof are formed anchorages of any suitable structure as hooks $1^g$ $1^h$, or eyes $1^i$, by means of which chains 3, $3^a$ or an extension plate D may be connected or attached to the clamp plate. Said extension plate is designed to be used when the rim or felly of the wheel to which my invention is attached is very wide, as in an automobile trunk wheel, but if said rim is narrow, as in light vehicles, said extension plates may be omitted and said chains may be engaged directly with said anchorages on said clamp plates. Said extension plates are provided on one longitudinal edge with anchorages of any suitable structure as hooks 4, $4^a$, or eyes $4^b$, by means of which they may be attached to the anchorages on said clamp plates, and are provided on their other longitudinal edge with anchorages of any suitable structure, as hooks $4^c$ $4^d$ or eyes $4^e$ by means of which they may be secured to additional extension plates or by means of which said chains may be secured to the extension plates—the chains being secured to the outer extension plates if such plates are used. Said chains are adapted to pass outwardly of the tire from one of said clamp plates to the other, or from the extension plate at one side of the wheel to the extension plate at the opposite side of the wheel as the case may be, and to provide means for biting into the surface of the roadway. The bolt C, passes through apertures provided therefor in the webs of said clamps, said aperture in one of said clamps being preferably in the form of a longitudinally directed slot as 5. Thus the clamp plates may be adjusted longitudinally with respect to each other.

The wings and terminal flanges form the walls of recesses X, X, adapted to receive adjoining spokes of the wheel near the rim, and the central web is adapted to extend between said spokes. The horizontal flanges and extension plates are adapted to lie upon the felly or rim of the wheel and are preferably curved slightly to conform to the circumferential curve of the wheel. The position of the anchorages at or near the ends of the clamp plates and extension plates obviates the tendency which the clamp plates might have to tilt under strain if the anchorages were near their centers. The wings and vertical terminal flanges are principally for the purpose of holding the structure snugly in operative position, since practically all of the strain will be met by the rim and horizontal flanges in a direction approximately parallel with the spokes. There will therefore be practically no danger of breaking a spoke. While said clamp plates may be cast, within the scope of certain of my claims, I prefer to make them of sheet metal which may be cut approximately as shown in solid lines in Fig. 2, of the drawing and bent into operative form approximately on the dotted lines in said figure. Said horizontal flange is preferably tied to said central web at or near its center by a tie of any suitable structure formed on said web or provided for the purpose, as the tie 6.

In mounting said invention in operative position upon the wheel, the clamp plates are first separated by withdrawing the bolt C; the chains remaining attached to both plates. The plates are then respectively brought into position at opposite sides of the wheel, so that the vertical webs will extend between two adjoining spokes; the chains extending transversely outwardly of the tire. One of the plates is then moved longitudinally against one of said spokes and the other plate against the other of said spokes, provided there be room for such longitudinal movement, and the plates are then bolted together by said bolt C. If the spokes are very wide transversely of the wheel, the clamp plates need not be in contact with each other but the length of the bolt C, will permit of their being spaced sufficiently to receive the spokes between their terminal flanges.

My invention may, however, within the scope of certain of my claims, be modified in various details and particularly in the form or position of the anchorages for attaching the extension plates or chains.

My invention may also, within the scope of my claims, be made in any suitable proportion or dimensions or materials.

What I claim, is—

1. In road gripping means for vehicle tires, the combination of two clamp plates, each comprising a vertical longitudinal central web, a laterally extending vertical wing at each end of said web, a vertical longitudinally directed flange at the outer end of each of said wings, an approximately horizontal longitudinal flange extending from one to the other of said vertical flanges at the outer edges thereof, said horizontal flange being provided approximately at its ends with anchorages for engaging flexible connecting means; flexible means engaged by the anchorages on both of said clamp plates and adapted to connect said plates together transversely, and means for connecting said plates together through their central webs, the structure being such that the wings and vertical flanges will form recesses at each end of the two clamp plates adapted to receive spokes of a wheel,—said horizontal flanges being adapted to lie upon the rim of such wheel and said flexible means being adapted in part to pass outwardly around the tire of such wheel from one to the other of said clamp plates.

2. A longitudinally vertically divided clamp having recesses at each of its ends adapted to receive the spokes of a wheel, said clamp being provided with approximately horizontal oppositely directed flanges extending from end to end thereof adapted to lie upon the rim or felly of such wheel, said flanges being provided approximately at each end with anchorages, said clamp being provided at each side with approximately horizontal extension plates engaged by said anchorages and adapted to lie upon the rim or felly of such wheel, flexible means attached to both of said extension plates, approximately at the ends thereof, and adapted to pass from one of said plates outwardly of the tire of said wheel to the opposite of said plates.

3. A vertically longitudinally divided clamp, having recesses at each of its ends adapted to receive spokes of a wheel, said clamp being adapted to extend between such spokes, the halves of said clamp being longitudinally adjustable with respect to each other, means for adjustably securing said halves together intermediate of said spoke recesses, each of said halves being provided with an approximately horizontal flange adapted to lie upon the rim or felly of such wheel, and flexible means connecting the flange of one of said halves with the flange of the other of said halves.

4. A vertically longitudinally divided clamp having recesses at each of its ends adapted to receive spokes of a wheel, each of the halves of said clamp having an approximately horizontal outwardly directed flange formed thereon extending from end to end thereof and formed of transversely divided sections, means for securing the free ends of said sections together, means for securing the halves of said clamp together inward of said flanges, and flexible means connecting said flange on one of said halves with said flange on the other of said halves, substantially as and for the purposes set forth.

In testimony whereof, I hereunto affix my signature, in presence of two witnesses.

ROBERT WENDLANDT.

Witnesses:
JAMES F. WATSON,
LOUIS J. GUHLKE.